US008131056B2

(12) United States Patent　　(10) Patent No.: US 8,131,056 B2
Polonsky et al.　　(45) Date of Patent: Mar. 6, 2012

(54) CONSTRUCTING VARIABILITY MAPS BY CORRELATING OFF-STATE LEAKAGE EMISSION IMAGES TO LAYOUT INFORMATION

(75) Inventors: Stanislav Polonsky, Putnam Valley, NY (US); Peilin Song, Lagrangeville, NY (US); Franco Stellari, Waldwick, NY (US); Alan J. Weger, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 12/241,926

(22) Filed: Sep. 30, 2008

(65) Prior Publication Data

US 2010/0080445 A1　Apr. 1, 2010

(51) Int. Cl.
*G06K 9/00* (2006.01)
(52) U.S. Cl. ........................................ 382/141
(58) Field of Classification Search ........... 382/141–182
See application file for complete search history.

(56) References Cited

U.S. PATENT DOCUMENTS

| | | | |
|---|---|---|---|
| 5,175,495 A | 12/1992 | Brahme et al. | |
| 6,894,518 B1 | 5/2005 | Bruce et al. | |
| 6,895,372 B1 | 5/2005 | Knebel et al. | |
| 6,909,295 B2 | 6/2005 | Polonsky et al. | |
| 6,943,578 B1 | 9/2005 | Sanda et al. | |
| 7,065,239 B2 * | 6/2006 | Maayah et al. | 382/145 |
| 7,400,154 B2 | 7/2008 | Desplats et al. | |
| 2003/0076989 A1 * | 4/2003 | Maayah et al. | 382/145 |
| 2005/0024057 A1 | 2/2005 | Desplats et al. | |
| 2006/0023931 A1 * | 2/2006 | Inoue | 382/144 |
| 2006/0028219 A1 * | 2/2006 | McDowell et al. | 324/752 |

FOREIGN PATENT DOCUMENTS

| | | |
|---|---|---|
| KR | 20080030800 A | 4/2008 |
| WO | 03/046593 A1 | 6/2003 |

OTHER PUBLICATIONS

S. Borkar et al., "Parameter Variations and Impact on Circuits and Microarchitecture," Design Automation Conference (DAC), Jun. 2003, pp. 338-342, California.

(Continued)

*Primary Examiner* — Michael P Stafira
(74) *Attorney, Agent, or Firm* — Anne V. Dougherty; Ryan, Mason & Lewis, LLP

(57) ABSTRACT

Improved techniques are disclosed for monitoring or sensing process variations in integrated circuit designs. Such techniques provide such improvements by constructing variability maps correlating leakage emission images to layout information. By way of example, a method for monitoring one or more manufacturing process variations associated with a device under test (e.g., integrated circuit) comprises the following steps. An emission image representing an energy emission associated with a leakage current of the device under test is obtained. The emission image is correlated with a layout of the device under test to form a cross emission image. Common structures on the cross emission image are selected and identified as regions of interest. One or more variability measures (e.g., figures of merit) are calculated based on the energy emissions associated with the regions of interest. A variability map is created based on the calculated variability measures, wherein the variability map is useable to monitor the one or more manufacturing process variations associated with the device under test.

25 Claims, 18 Drawing Sheets

OTHER PUBLICATIONS

K.A. Bowman et al., "Impact of Die-to Die and Within-Die Parameter Fluctuations on the Maximum Clock Frequency Distribution for Gigascale Integration," IEEE Journal of Solid-State Circuits, Feb. 2002, pp. 183-190, vol. 37, No. 2.

J. W. Tschanz et al., "Adaptive Body Bias for Reducing Impacts of Die-to-Die and Within-Die Parameter Variations on Microprocessor Frequency and Leakage," IEEE Journal of Solid-State Circuits, Nov. 2002, pp. 1396-1402, vol. 37, No. 11.

N. Azizi et al., "Compensation for Within-Die Variations in Dynamic Logic by Using Body-Bias," IEEE-NEWCAS, pp. 167-170, Jun. 2005.

A. Keshavarzi et al., "Measurement and Modeling of Intrinsic Fluctuations in MOSFET Threshold Voltage," ISLPED, Aug. 2005, pp. 26-29, California.

H. Klimach et al., "Characterization of MOS Transistor Current Mismatch," Symp. Int. Circuits Sys. Design (SBCCI), Sep. 2004, pp. 33-38, Brazil.

K. Agarwal et al., "A Test Structure for Characterizing Local Device Mismatches," IEEE, Symposium on VLSI Circuits Digest of Technical Papers, pp. 67-68, Jun. 2006.

N. Drego et al., "A Test Structure to Efficiently Study Threshold-Voltage Variation in Large MOSFET Arrays," Procs. of the 8th International Symposium on Quality Electronic Design (ISQED), Mar. 2007, pp. 281-286.

M. Bhushan et al., "Ring Oscillator Based Technique for Measuring Variability Statistics," IEEE, ICMTS, pp. 87-92, Mar. 2006.

C.H. Kim et al., "Self Calibrating Circuit Design for Variation Tolerant VLSI Systems," Procs. of the 11th IEEE International On-Line Testing Symposium, (IOLTS), pp. 1-6, Jul. 2005.

S. Mukhopadhyay et al., "Statistical Characterization and On-Chip Measurement Methods for Local Random Variability of a Process Using Sense-Amplifier-Based Test Structure," IEEE International Solid-State Circuits Conference, Digital Circuit Innovations, (ISSCC), Feb. 2007, pp. 400-401, Session 22.

R. Rao et al., "A Completely Digital On-Chip Circuit for Local-Random-Variability Measurement", IEEE International Solid-State Circuits Conference, Variation Compensation & Measurement (ISSCC), Feb. 2008, pp. 412-413, Session 22.

B.L. Ji et al., "Operational Amplifier Based Test Structure for Transistor Threshold Voltage Variation," IEEE Conference on Microelectronic Test Structures (ICMTS), Mar. 2008, pp. 3-7, United Kingdom.

M. Meterelliyoz et al., "A High Sensitivity Process Variation Sensor Utilizing Sub-threshold Operation," Procs. Custom Integrated Circuits Conference (CICC), 2008, pp. 1-4, California.

S. Polonsky et al., "Picosecond Imaging Circuit Analysis of Leakage Currents in CMOS Circuits," Procs. form the 28th International Symposium for Testing and Failure Analysis (ISTFA), Nov. 2002, pp. 387-390, Arizona.

S. Polonsky et al., "Photon Emission Microscopy of Inter/Intra Chip Device Performance Variations," ESREF, 2005, pp. 1471-1475.

* cited by examiner

200

300

FIGURE OF MERIT = 0
FOR EACH PIXEL INSIDE THE ROI
FIGURE OF MERIT += PIXEL VALUE

THE FOUR CORES OF THE CHIP ARE HIGHLIGHTED BY THE WHITE BOXES

THIS CORE HAS THE BRIGHTER EMISSION AND THEREFORE THE HIGHEST LEAKAGE

FIG. 13
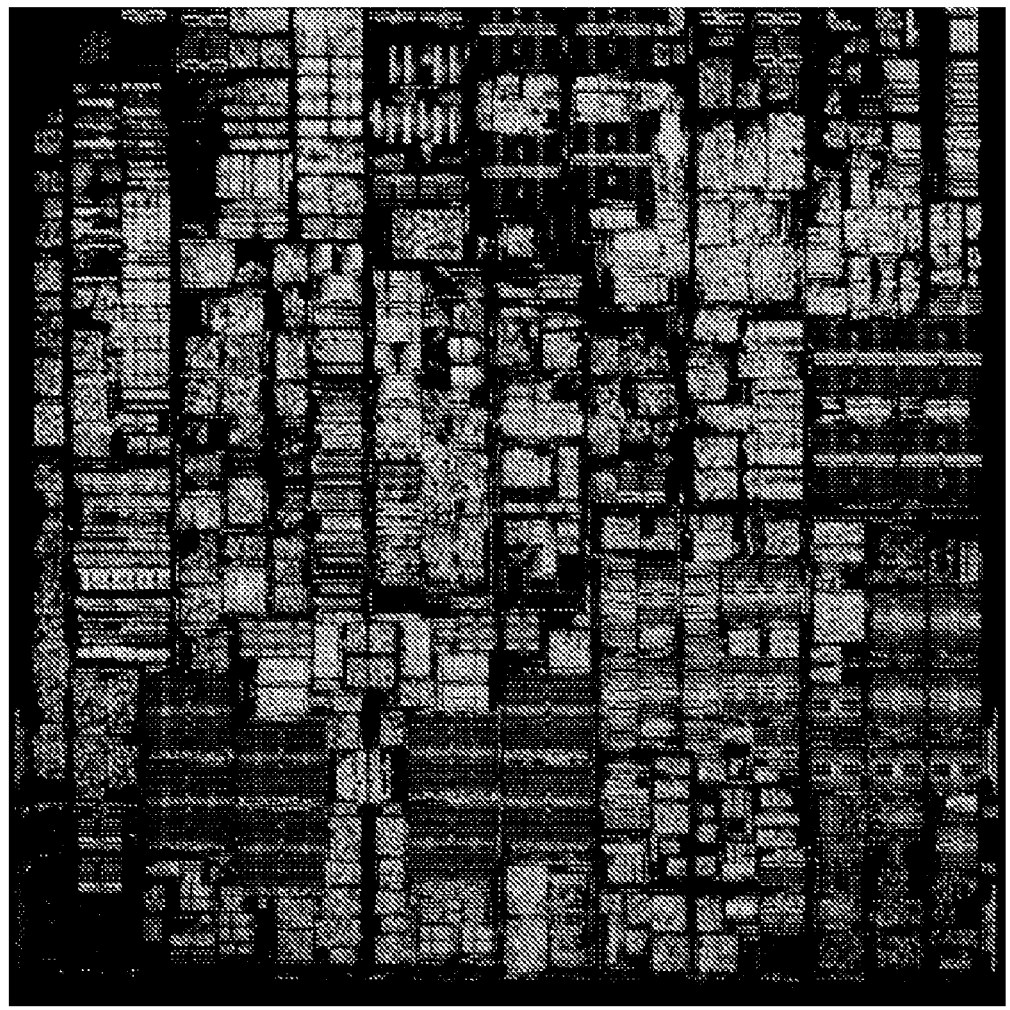
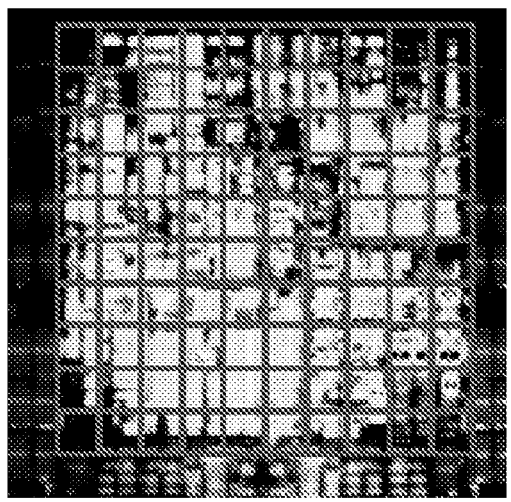
10 x 10
10x IMAGES
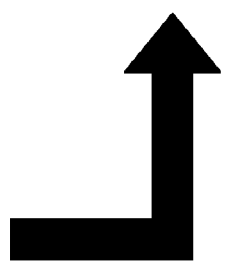

THE CENTER OF THE IMAGE IS ALWAYS HOTTER AND THEREFORE ARTIFICIALLY BRIGHTER

1800

CONSTRUCTING VARIABILITY MAPS BY CORRELATING OFF-STATE LEAKAGE EMISSION IMAGES TO LAYOUT INFORMATION

FIELD OF THE INVENTION

The present invention generally relates to integrated circuit designs and, more particularly, to improved techniques for monitoring or sensing process variations in such integrated circuit designs.

BACKGROUND OF THE INVENTION

The ever increasing need for high performance and increased chip (integrated circuit or IC) functionality with lower costs has resulted in aggressive scaling of transistor dimensions. As transistor dimensions are scaled down, the effect of parameter variations on circuit robustness increases. Increased process variations result in lower circuit performance and can potentially lead to functional/parametric failures degrading manufacturing yield.

Process variations can be classified into distinct categories: process variations can be "inter-die" or "intra-die;" and process variations can also be "random" or "systematic." An inter-die process variation is a process variation across multiple dies. An intra-die process variation is a process variation across a single die. A systematic process variation is one that exhibits a systematic correlation with some parameter. A random process variation is one that does not exhibit any meaningful correlation. Thus, you can have four process variation cases, inter-die random, inter-die systematic, intra-die random, or intra-die systematic.

Hence, it is important to monitor/track the effect of process variations and to tune the process for improving the manufacturing yield.

SUMMARY OF THE INVENTION

Embodiments of the invention provide improved techniques for monitoring or sensing process variations in integrated circuit designs. Such techniques provide such improvements by constructing variability maps correlating leakage emission images to layout information.

By way of example, in one embodiment, a method for monitoring one or more manufacturing process variations associated with a device under test (e.g., integrated circuit) comprises the following steps. An emission image representing an energy emission associated with a leakage current of the device under test is obtained. The emission image is correlated with a layout of the device under test to form a cross emission image. Common structures on the cross emission image are selected and identified as regions of interest. One or more variability measures (e.g., figures of merit) are calculated based on the energy emissions associated with the regions of interest. A variability map is created based on the calculated variability measures, wherein the variability map is useable to monitor the one or more manufacturing process variations associated with the device under test.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 13 illustrates an emission image composed by a set of 10×10 individual images according to an embodiment of the invention.

DETAILED DESCRIPTION OF PREFERRED EMBODIMENTS

Illustrative embodiments of the invention will be described herein in the context of an illustrative integrated circuit testing environment. However, it is to be understood that principles of the invention are more generally applicable to a wide variety of other integrated circuit testing environments wherein it would be desirable to employ techniques for constructing chip variability maps quickly, easily, reliably and in a repeatable fashion.

Such illustrative embodiments of the invention construct variability maps using images of energy being emitted in the near infrared spectrum by a device under test, such as an IC. The particular energy that is used in the illustrative embodiments is the Light Emission from Off-State Leakage Current (LEOSLC) from an IC.

It is noted that Polonsky et al. (see S. Polonsky, A. J. Weger, and M. K. McManus, U.S. Pat. No. 6,909,295, "Analysis methods of leakage current luminescence in CMOS circuits," Jun. 21, 2005; and S. Polonsky, A. Weger and M. K.

McManus, "Picosecond Imaging Circuit Analysis of Leakage Currents in CMOS Circuits," *International Symposium for Testing and Failure Analysis (ISTFA)*, 2002, the disclosures of which are incorporated by reference) proposes the idea of using Light Emission from Off-State Leakage Current (LEOSLC) for estimating the leakage of a gate in a non-invasive fashion. Since the leakage is a strong function of many important technology parameters such as threshold voltage, gate oxide thickness, geometry, gate length, etc., as well as gate configuration and state, and operating conditions such as supply voltage and temperature, it can be effectively used to measure such parameters and chart their changes in time and/or space, across chips or inside a chip. For example, in has been shown (see S. Polonsky et al, "Photon emission microscopy of inter/intra chip device performance variations," ESREF 2005, the disclosure of which is incorporated by reference herein) that the LEOSLC from nominally identical devices may be different and correlates with the variations in electrical characteristics (such as ring oscillator operating frequency) of such devices across the chip.

Figure 1:
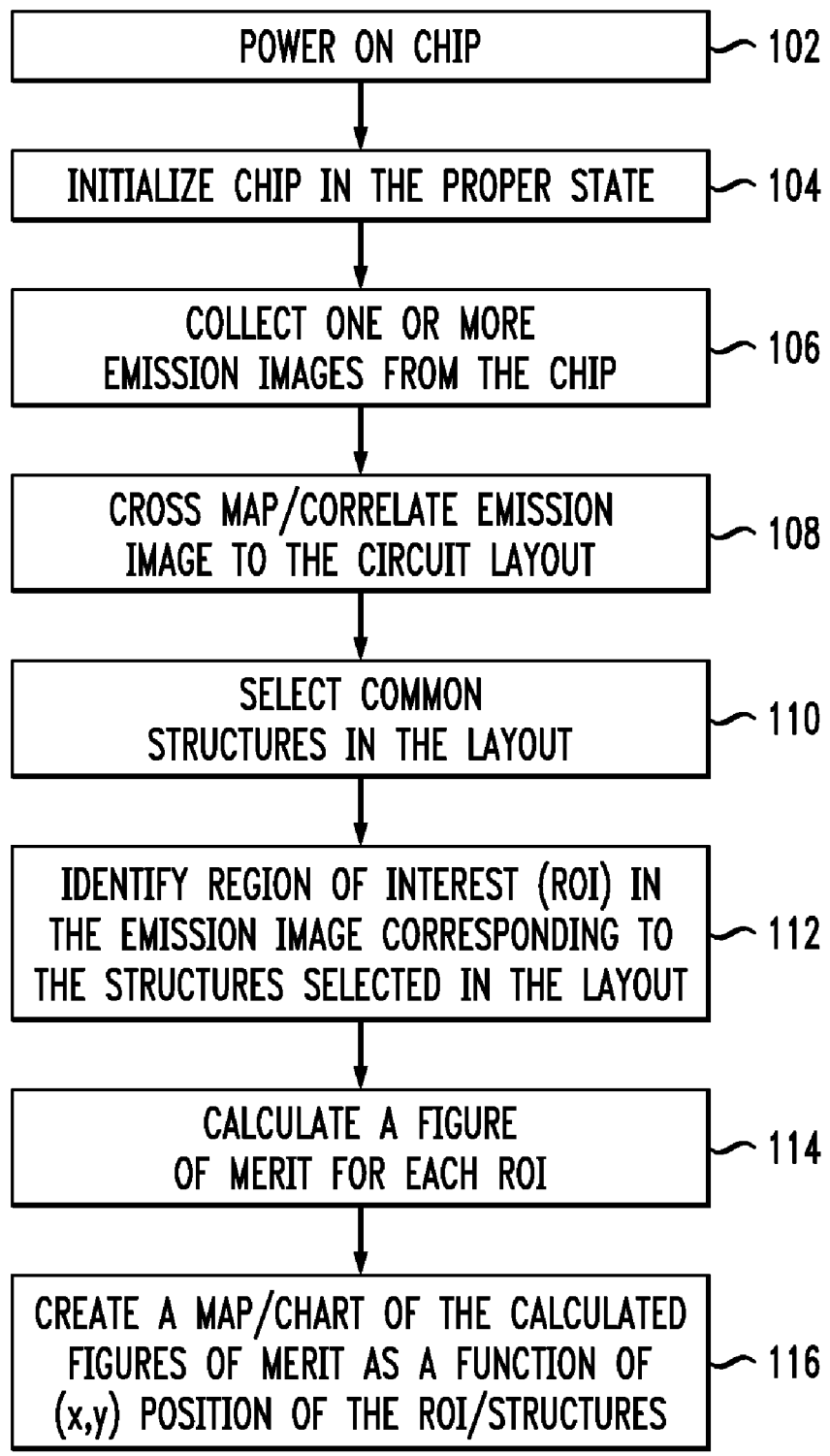
FIG. 1 illustrates a methodology for creating a variability map according to an embodiment of the invention.

With reference now to FIG. 1, methodology 100 provides a technique for creating a variability map according to an embodiment of the invention. In this embodiment, as will be further explained below, while collection of LEOSLC is preferably used, other types of emission microscopy can be employed. As described below, appropriate initialization of the IC (device under test or DUT) is performed to make sure that the regions of interest (referred to as ROIs) are in a stationary condition, and what the system is measuring is the LEOSLC and not emission from switching gates, which is different. Thus, one needs some kind of light collection system (e.g., microscope) and a camera sensitive to the wavelength of interest (i.e., near infrared region of the spectrum ~1 micrometer to 1.5-17 micrometers). Once the chip is initialized and biased properly and the cooling is settled to maintain a constant/uniform temperature, the system can acquire the emission image by integrating the emission in time inside the camera pixels. We now describe such an illustrative system.

An integrated circuit (IC or chip) is powered on (step 102) and initialized in the proper state (step 104). It is to be appreciated that the powering on and the set up of the IC (DUT) depends on the specific IC being tested. By way of one example, powering on the IC can be achieved with the use of one or more appropriate power supplies, and the setup can be achieved with an IC tester such as the HP 82000 IC Evaluation System (available from Hewlett Packard of Palo Alto, Calif.).

In step 106, the methodology collects one or more emission images from the chip.

Figure 2:
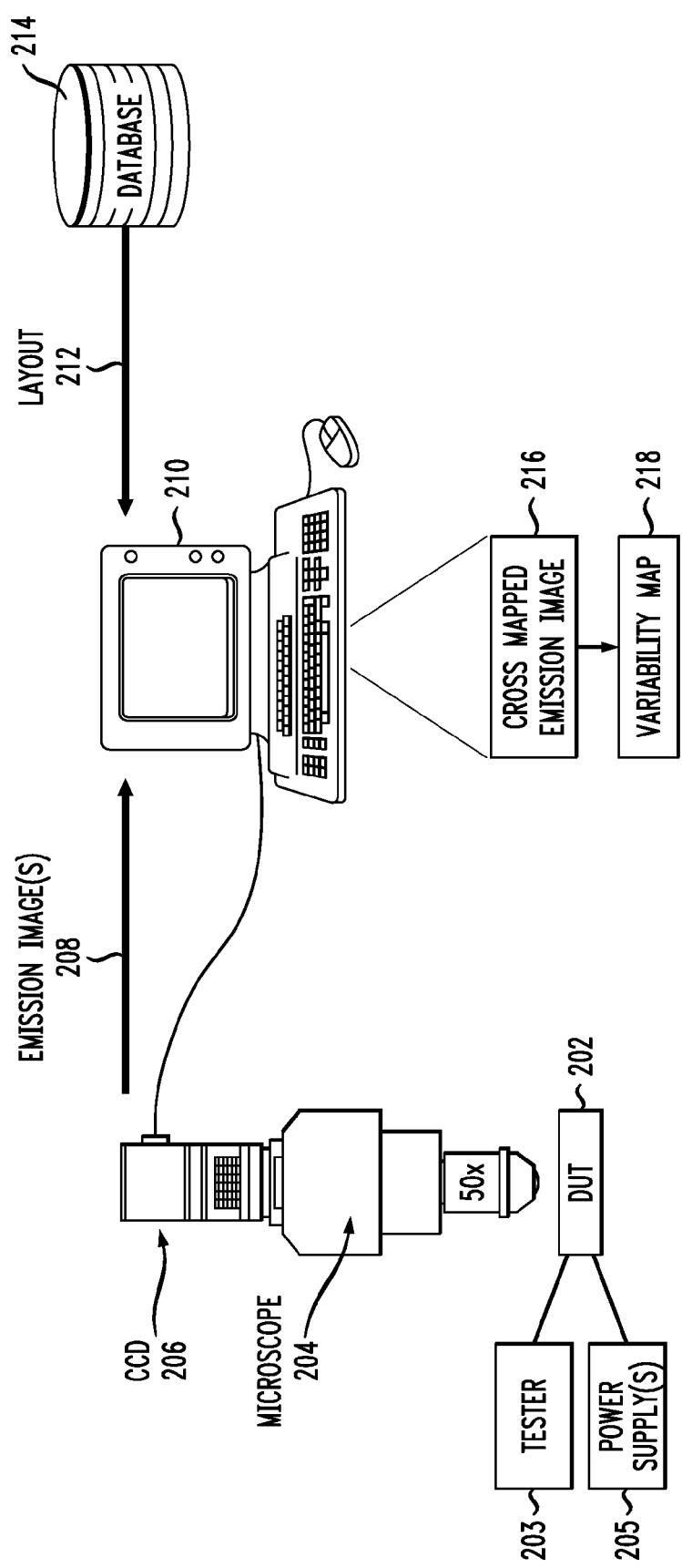
FIG. 2 illustrates a system for creating a variability map according to an embodiment of the invention.

An example of a system 200 that employs methodology 100 is depicted in FIG. 2, and will be referenced in the context of this further description of FIG. 1.

As shown in FIG. 2, DUT 202 (e.g., a single chip being tested) is coupled to tester 203 (e.g., IC evaluation system HP82000) and power supply 205. The power supply supplies power on the chip and the tester initializes the chip to the proper state. DUT 202 is placed in the focal plane of (in focus of) an optical collection device, such as microscope 204, that is coupled between a camera that is sensitive to energy being emitted in the near infrared spectrum, e.g., the energy produced by the off-state leakage current (LEOSLC) from the chip. The collection optics, in close proximity of the DUT, collect the emission and focus it onto the camera that integrates the emission for a prefixed amount of time.

By way of example, a charge coupled device or CCD 206 can be used as the image capture device. Alternatively, Mercad Telliurite (MCT), or InGaAs (Indium-Gallium-Arsenide) cameras can be used. The emission image(s) 208 captured by microscope 204/CCD 206 is the energy being emitted in the near infrared spectrum by DUT 202 while being tested in accordance with a test program run by tester 203. Such testing and image capture may be accomplished using one or more of the LEOSLC methods mentioned above.

The captured emission image is sent to a computing device, such as computer system 210 (e.g., personal computer, laptop, server, etc.), which controls acquisition, correlation and analysis of the data. Computer system 210 obtains a physical circuit layout 212 of the DUT from database 214. The collected emission image is then cross mapped to the layout of the chip using known linear transformation or feature recognition algorithms (e.g., commonly used autocorrelation may be one example) leading to a cross mapped emission image 216. Referring back to methodology 100 of FIG. 1, this cross map/correlation process corresponds to step 108. As will be further explained, from the cross mapped emission image, computer system 210 creates a variability map 218.

Figure 3:
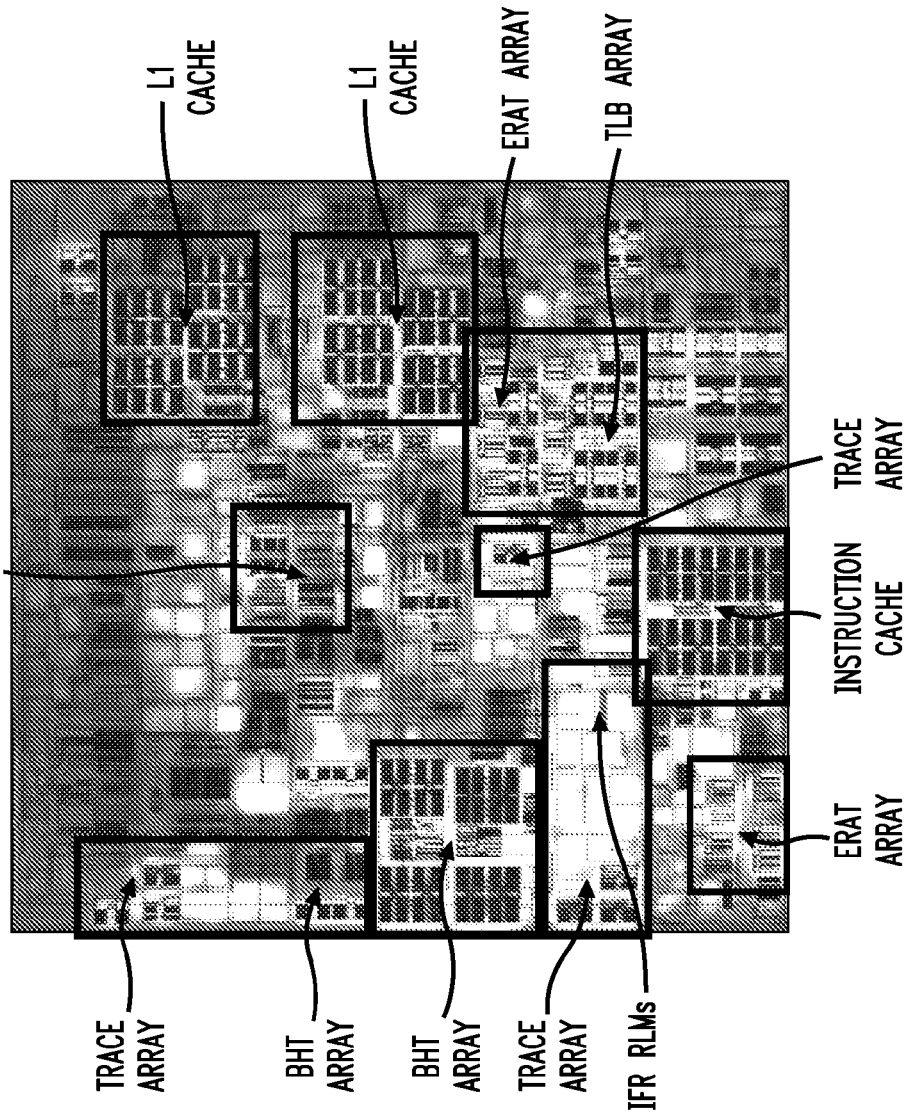
FIG. 3 illustrates an emission image according to an embodiment of the invention.
Figure 4:
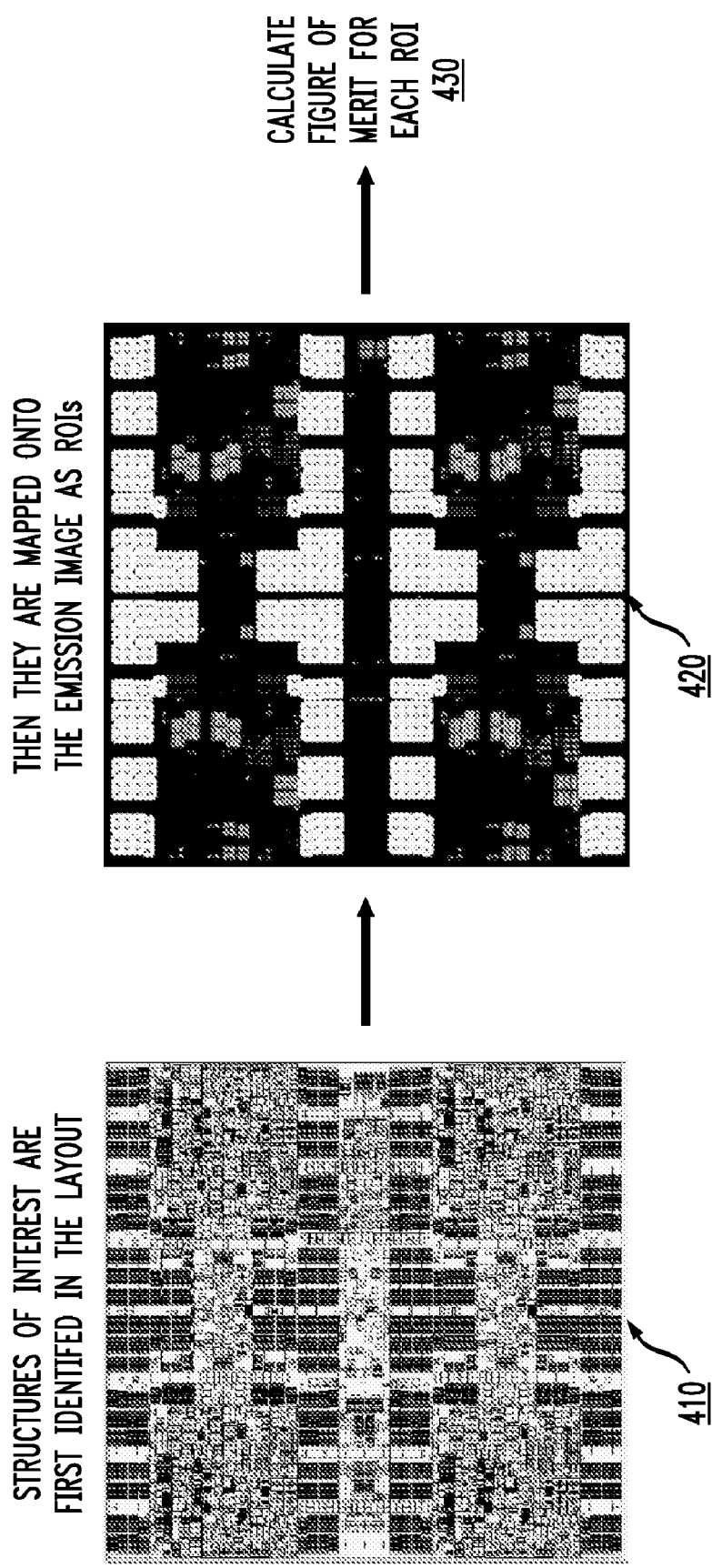
FIG. 4 illustrates a layout image and a cross mapped emission image according to an embodiment of the invention.

By way of example, FIG. 3 shows an illustrative emission image 300 that is captured by the combination of microscope 204/CCD 206. FIG. 4 illustrates an example of a layout 410 (obtained from database 214) and a cross mapped emission image 420 (generated by computer 210). We will explain step 430 below.

Figure 5:
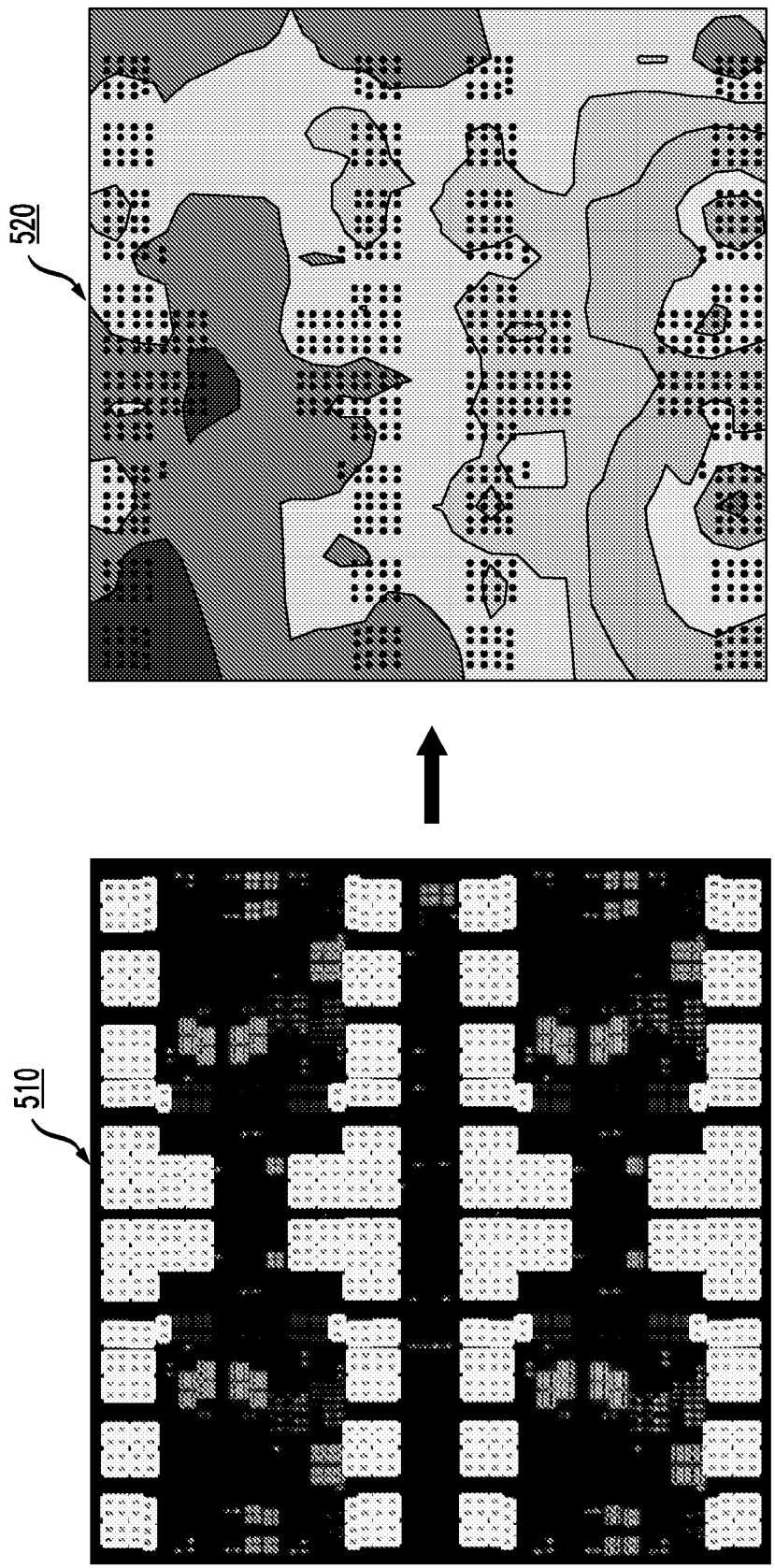
FIG. 5 illustrates a cross mapped emission image and a variability map according to an embodiment of the invention.

Subsequently, as shown in FIG. 5, using the cross emission image 510, areas of the layout with similar/identical (common or repeating) circuits are identified and the emission of the corresponding regions of the collected image is extracted. By comparing such emission areas for repetitive layout regions, a map of the variability across the chip is created by interpolating the data, e.g., variability map 520. It is to be understood that the white boxes on image 510 identify structures (in particular array blocks) that have been cross mapped from the layout onto the emission image captured by the microscope/camera so that the system knows what part of the emission (which pixels) image is associated to each "nominally" identical structure. For each white box, the system performs an analysis and calculates the figure of merit. Based on that data, the system creates the variability map 520 that is specifically shown as a contour plot. In this illustrative contour plot, different gray shadings are associated with certain percent changes of the figure of merit. However, rather than gray shadings, colors may be employed. For example, red may mean that the figure of merit for that region is much higher than the average value, blue may mean that it is much below, and so on. Also, it is to be understood that the map could show a normalized number range (+1 to −1) for the change rather than specific +/− percentages. The dots on map 520 are shown to highlight the position of the structures in the layout and emission image that were used to create the map. So each black dot in map 520 corresponds to a white box in image 510. The dots are sometimes useful to interpret the variability map do not necessarily have to be shown on the map.

Figure 6:
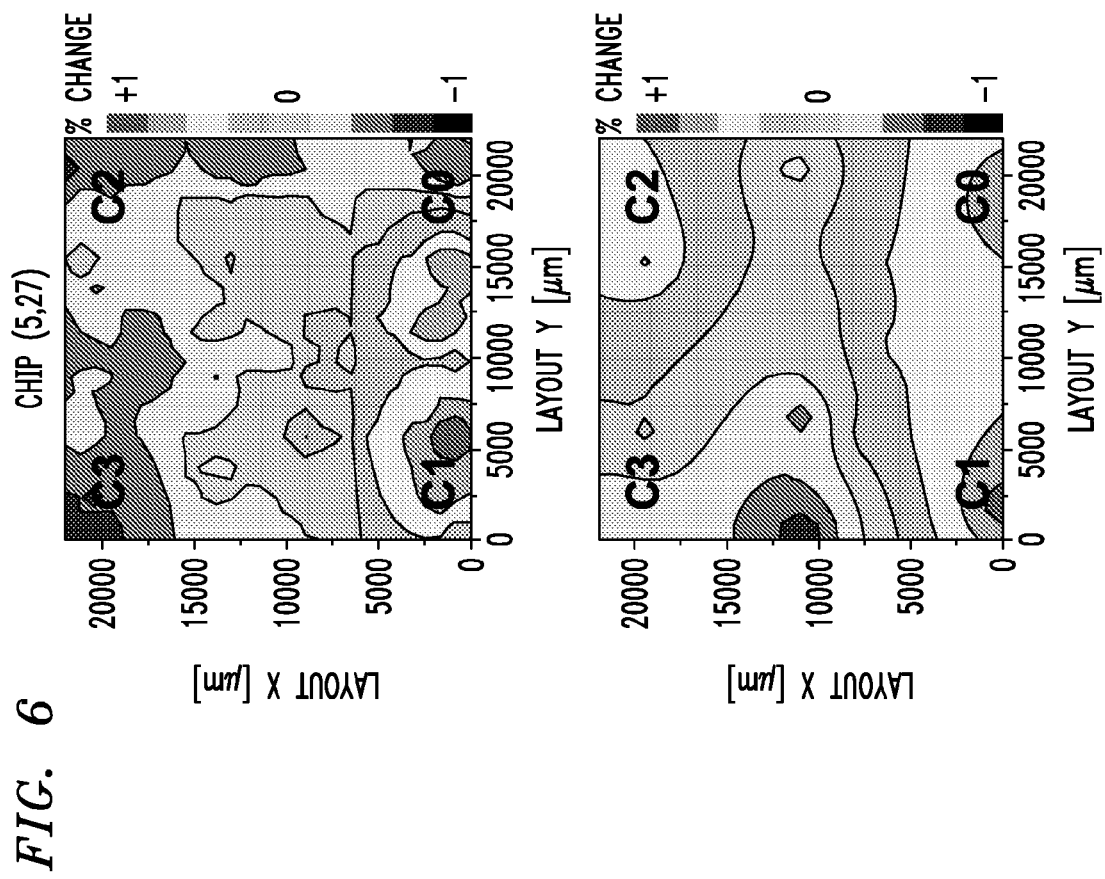
FIG. 6 illustrates a comparison of variability map obtained data to on-chip electric sensor obtained data for two different chips.

It is to be appreciated that the variability maps created using the above method have been successfully verified by comparing them to data obtained by on-chip electric sensors, power supply currents, and test results, see FIG. 6. The visual representation is very helpful in picking up systematic effect and to measure the correlation distance of the variations.

The two images on the left side of FIG. 6 refer to one chip (5,27), the two on the right refer to a different chip (6,12), e.g., chip A and chip B. Note that the (x,y) coordinates refer to the spatial location of the chip in a given wafer. The top images for each side are the variability maps created with the inventive methods described herein. The bottom images for each side are created using lower spatial resolution electrical data (in particular Process Sensitive Ring Oscillators=PSROs). There are three main points to consider for FIG. 6:

1) For a given chip (left or right), the variability maps obtained with the inventive methods are qualitatively similar to the ones obtained with the PSRO, except for the higher resolution that we can achieve;
2) We look at left and right images for different chips and compare so as to seek across chip variations on a given wafer. For example, the fact that C1 in the top left image of chip (5/27) is very hot (due to percent change illustrated by shading), this information was correlated to the fact that the corner of that chip was close to the wafer edge, suffering from peripheral effect in the fabrication process.
3) Looking again top and bottom for each chip, one can correlate the electrical data in the low resolution image below to the high resolution variability map above to calibrate the map (as further described below).

We now describe in more detail how the variability map is created.

Recall that, as shown in FIG. 2, an emission image is acquired with a camera sensitive to the near infrared emission from the chip. The emission is time integrated over several seconds or minutes depending on the intensity of the emission and the sensitivity of the camera. The layout coordinates and polygons for the chip under test are extracted from the layout database. The emission image is then processed through linear transformations such as resizing, rotation, flipping, and/or translation in order to match the layout data. Usually, areas of brighter emission (corresponding to a better signal to noise ratio) are selected to improve the efficiency of the algorithm. This process can range from totally manual (controlled by the user) to fully automated where features in the layout and emission are recognized by the software and matched. In this last case, it is of particular importance to enable only certain layers of the layout that are mostly connected to the emission in order to remove confusing features, and thus work with the most similar pattern.

More typically, a combination of the manual and automated approach is used, where the user provides the algorithm with a starting point close to the correct alignment and then the algorithm takes over and perfects the final matching. Successively, the user identifies certain features or structures in the layout that repeat across the chip. This corresponds to step 110 in FIG. 1. While a list of possible structures is given below, a general rule is to select a feature or structure that emits a significant amount of light (energy). The selected structure is searched inside the layout and the coordinates of each instance are returned.

Figure 7:
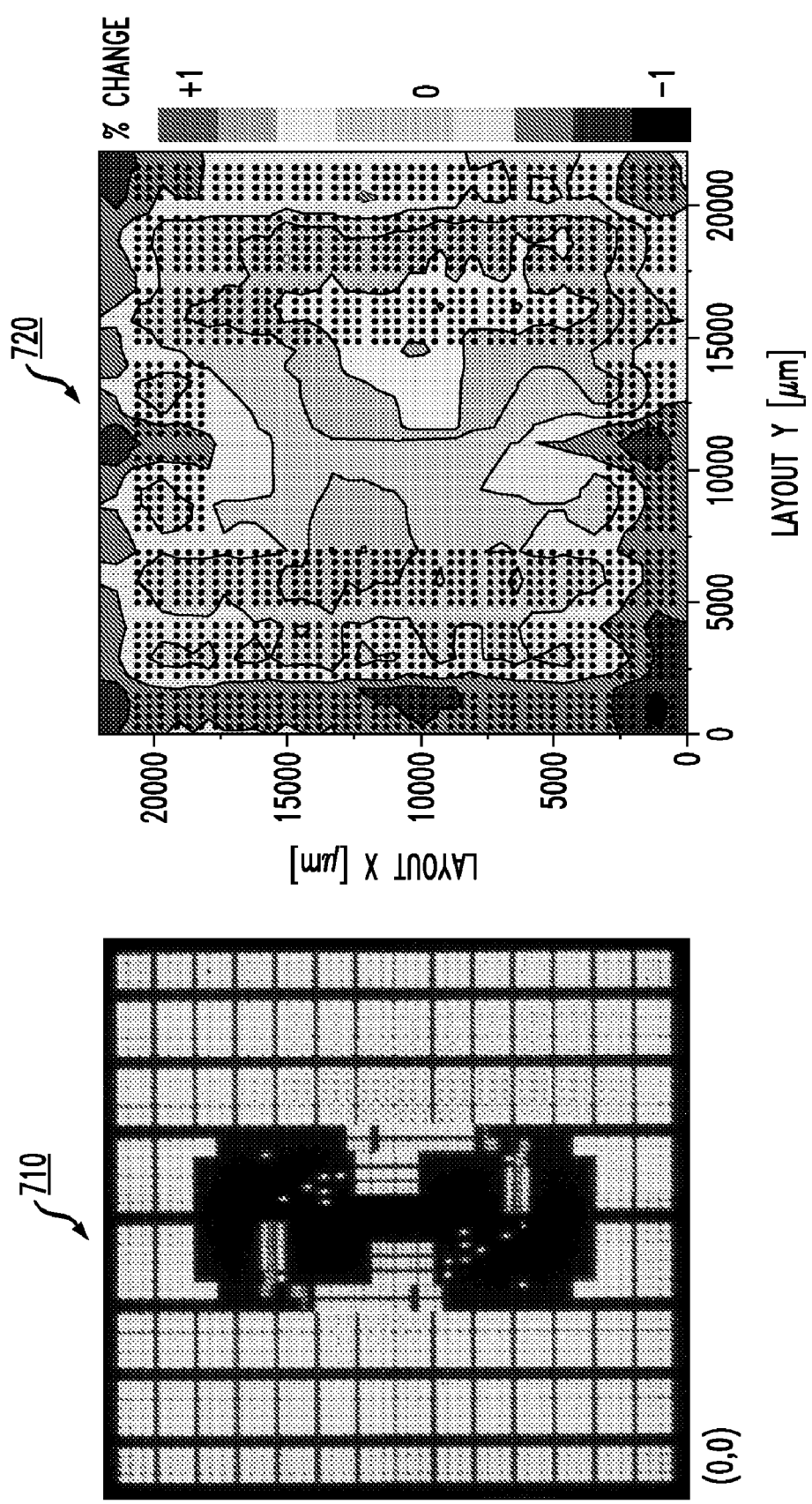
FIG. 7 illustrates mapping of coordinates onto an emission image to identify corresponding regions of interest according to an embodiment of the invention.

The coordinates are then mapped onto the emission image to identify corresponding regions of interest (ROI). This corresponds to step 112 in FIG. 1 and is illustrated in FIG. 7. The white boxes in cross emission image 710 are the regions of interest (ROIs) for the analysis; in this case, memory blocks of a common size. Subsequently, for each ROI, a figure of merit is calculated, for example, the emission intensity is integrated across the ROI. This corresponds to step 114 in FIG. 1. More complicated figures of merit may also be calculated in which additional transformations are used for calibration, normalization, etc. Finally, the figures of merit are plotted as a function of the coordinates of each instance. The result plot can be shown in a form of a map, a three dimensional surface, a two dimensional cross section, etc, or in any other manner that can help better interpret the data. This corresponds to step 116 in FIG. 1. Image 720 is such a variability map created based on the calculated figures of merit. Note that the positions of the same ROIs are mapped as black dots in map 720.

In one illustrative embodiment, the figure of merit to measure variability is calculated by integrating the emission over the ROI. By way of example only, this may be done by creating a box-like ROI corresponding to the structure of interest and integrating the emission across the ROI, possibly normalizing the result to the dimension of the ROI. This is illustrated in FIG. 8.

Figure 8:
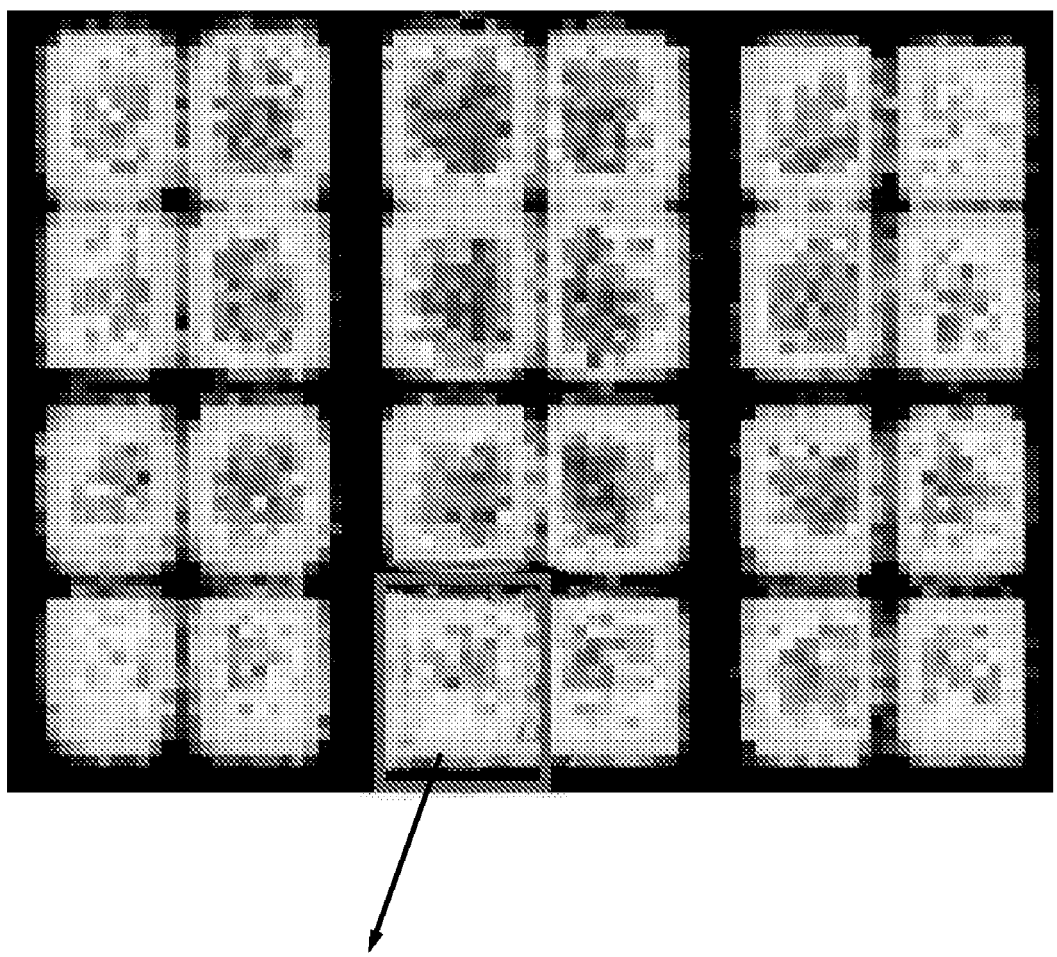
FIG. 8 illustrates calculation of a figure of merit used to measure variability by integrating an emission over a region of interest according to an embodiment of the invention.

More particularly, FIG. 8 represents a zoom-in of a region of one of the previous emission images e.g., 510 or 710. The rectangular bright spots are the emission from different memory blocks, 4×6 shown in the zoom-in. Each block may be considered as a unique structure to be used to extract the figure of merit. From the image point of view, the memory block is composed of pixels acquired with the camera. In particular, for each one of the memory blocks, the system applies an algorithm to calculate the figure of merit such as the simple program in the bottom part of FIG. 8. The system defines the pixels associated with a particular memory block (for example, the one with the arrow). This is done by correlating with the layout that defines the boundaries of a given structure to be mapped back onto the emission image. Then, the system goes though the pixels of the structure and sums them up to obtain the integral of the emission from that structure and its figure of merit, as specifically defined here. Then, the system goes over all the structures and repeats the same process. The resulting values may also be normalized to take into account other measurement conditions such as voltage, chip power, temperature, etc. In practice, the integration may be smaller than the ROI to reduce effects due to the neighboring gates as well as edge effects.

Figure 9:
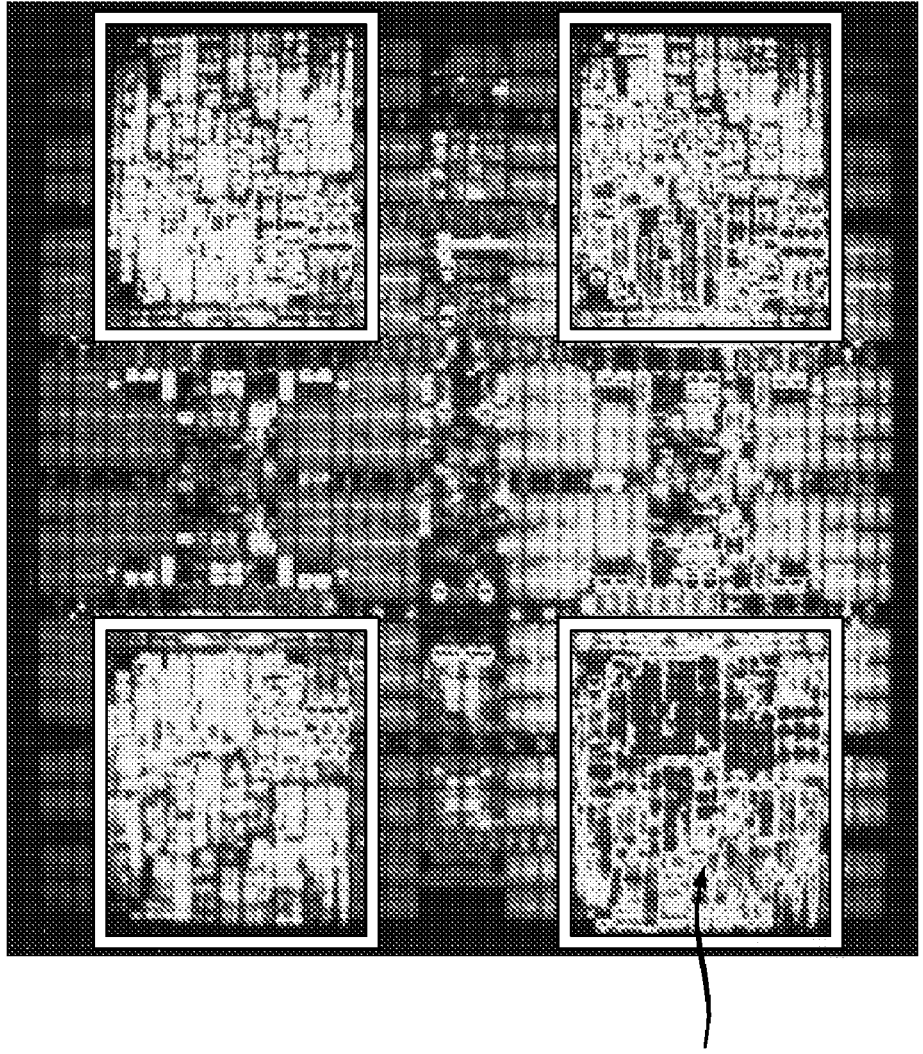
FIG. 9 illustrates cores being used as identified circuit structures for creation of a variability map according to an embodiment of the invention.
Figure 10:
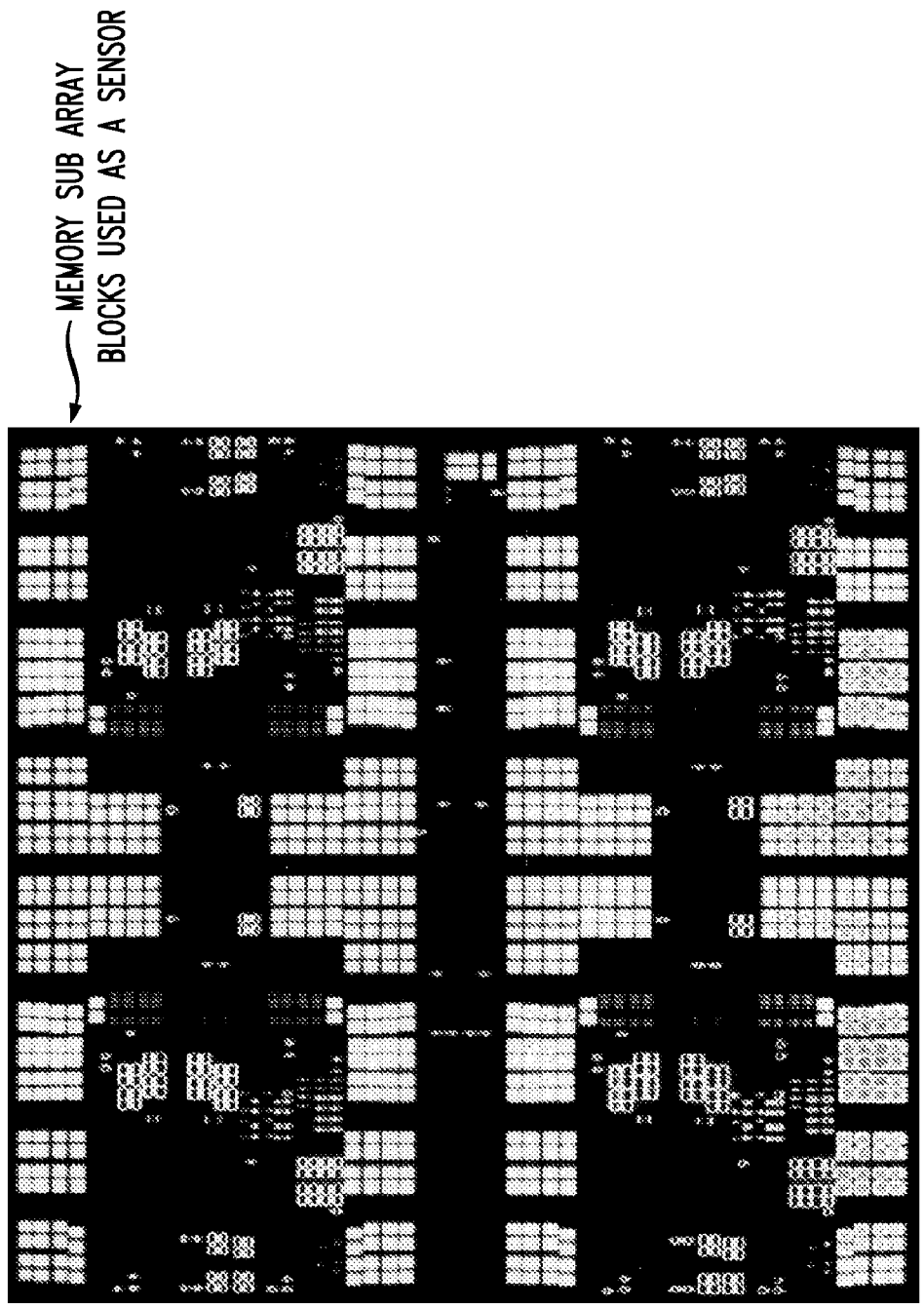
FIG. 10 illustrates memory elements being used as identified circuit structures for creation of a variability map according to an embodiment of the invention.
Figure 11:
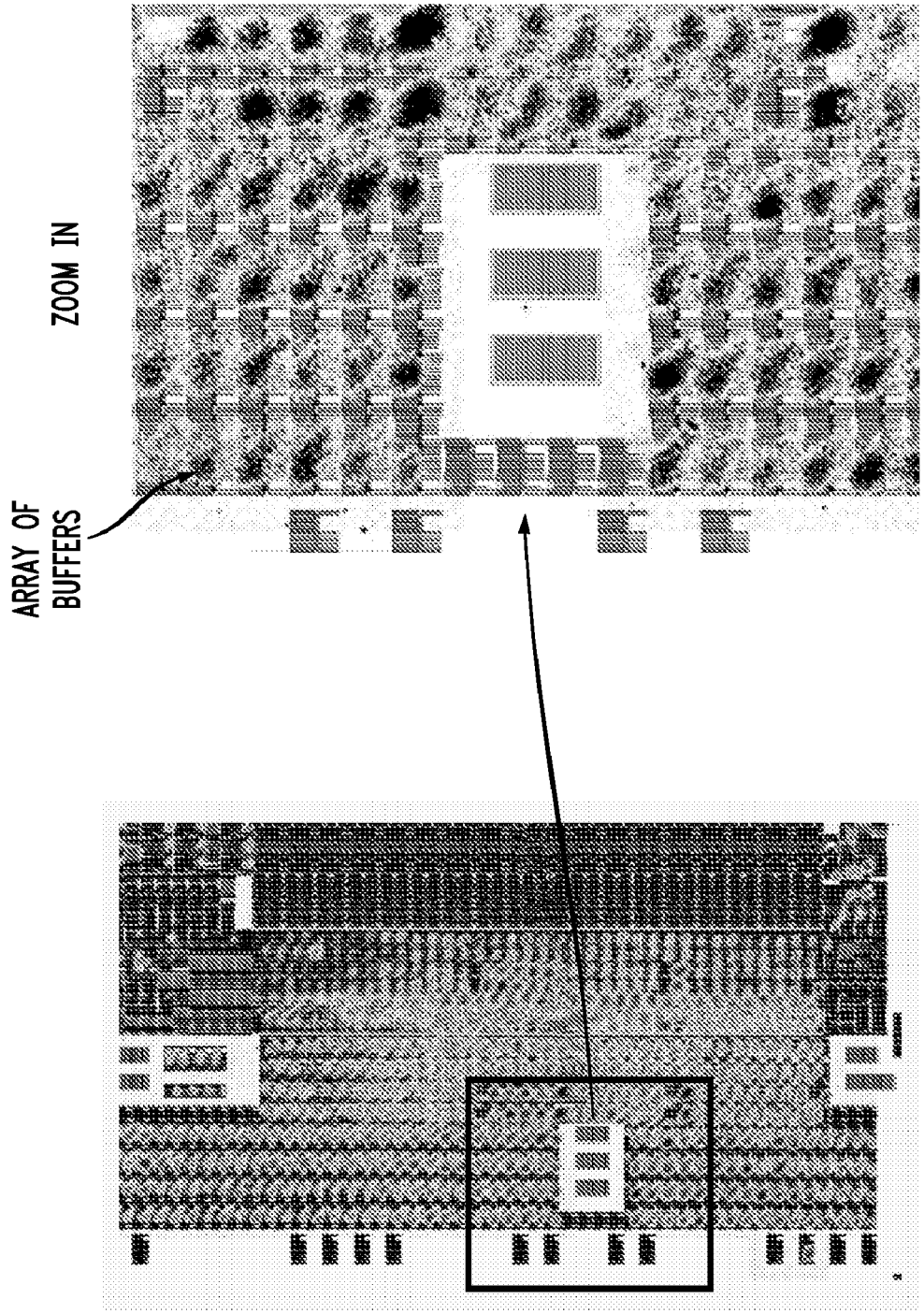
FIG. 11 illustrates buffer arrays being used as identified circuit structures for creation of a variability map according to an embodiment of the invention.

Further, in an illustrative embodiment, the repeating structures or features (which serve as "sensors" for sensing the corresponding leakage current) from the IC layout can, for example, be (with progressively smaller granularity and higher spatial resolution):

entire cores: as shown in FIG. 9, this allows to directly compare performance of different cores in a multi-core chip by correlating the emission to core power;

memory sub-array: these are more widely and more finely distributed and allow therefore to create variability maps with significantly higher spatial resolution compared to on-chip electronic sensors (see FIG. 10); and smaller structures such as arrays of individual buffers and latches: they can be used locally to study thermal gradients or highlight layout dependent effects affecting manufacturing processes, such as Rapid Thermal Annealing (RTA) (see FIG. 11).

Entire cores may be used to evaluate variability in multi-core chips like the present P6 and Z6 products as well as most future products. Comparing entire cores allows a direct correlation with electrical performance such as speed and dissipated power. Moreover, sub-circuits composing the cores may be compared to identify regions of abnormal leakage and emission.

On the other side, for the time being, the number of cores available on any chip is about 2-4 for the moment (future chips will probably contain progressively more cores so the core comparison may become more important and allow for higher resolution than today) and it is therefore too small to allow creating a detailed variability map. Therefore, selection of other types of structures that are more widely spread across the chip may be preferred.

One such candidate that is particularly suitable is memory. Memory in the form of L1 and L1.5 caches are becoming larger and larger in order to support the growing number of cores. For products such as P6 and Z6, these structures take up a very large part of the real estate of the chip.

Moreover, the arrays have good emission intensity, are quite uniformly distributed across the chip and can be easily initialized to a common state or randomized. Additionally, the arrays usually have a separate power grid that allows biasing them independently. This can be used in several ways. In one implementation, the voltage of the array may be increased compared to the rest of the chip so that they can be better identified, isolated and the interference from the emission of other gates reduced. Alternatively, the array may be the only part of the chip that is powered on (possibly the entire chip is powered on, initialized and then all supplies except the array are shut off). This again increases the signal-to-noise-ratio (SNR) but also significantly reduces problems relative to thermal gradients across the chip by reducing the overall power dissipation. For these reasons, most of the cases considered in this illustrative analysis involve the use of arrays.

Additionally, other, smaller, types of structures can be used such as individual buffers, latches, etc. In particular, FIG. 11 shows an example of several buffers packed closely together. A high magnification image of the LEOSLC of the buffers allows studying edge effects of the spatial distribution of the buffers as well as the thermal effects of neighboring gates. Emission intensity changes are visible along rows of buffers. Other areas jump out for abnormally high emission pointing to lithographic, RTA, temperature non-uniformity problems.

Still further, it is to be appreciated that the LEOSLC may be acquired using static cameras such as Charge Coupled Devices (CCDs), Mercad Telliurite (MCT), and/or InGaAs cameras. Different types of camera may be used to acquire the LEOSLC, depending on the specific needs. When high resolution of small ROIs is the most important requirement, then cameras with a high number of pixels like Charge Coupled Devices (CCDs) may be preferred to more sensitive camera with larger and fewer pixels. In the examples presented herein, a silicon back illuminated CCD camera was used.

Figure 12:
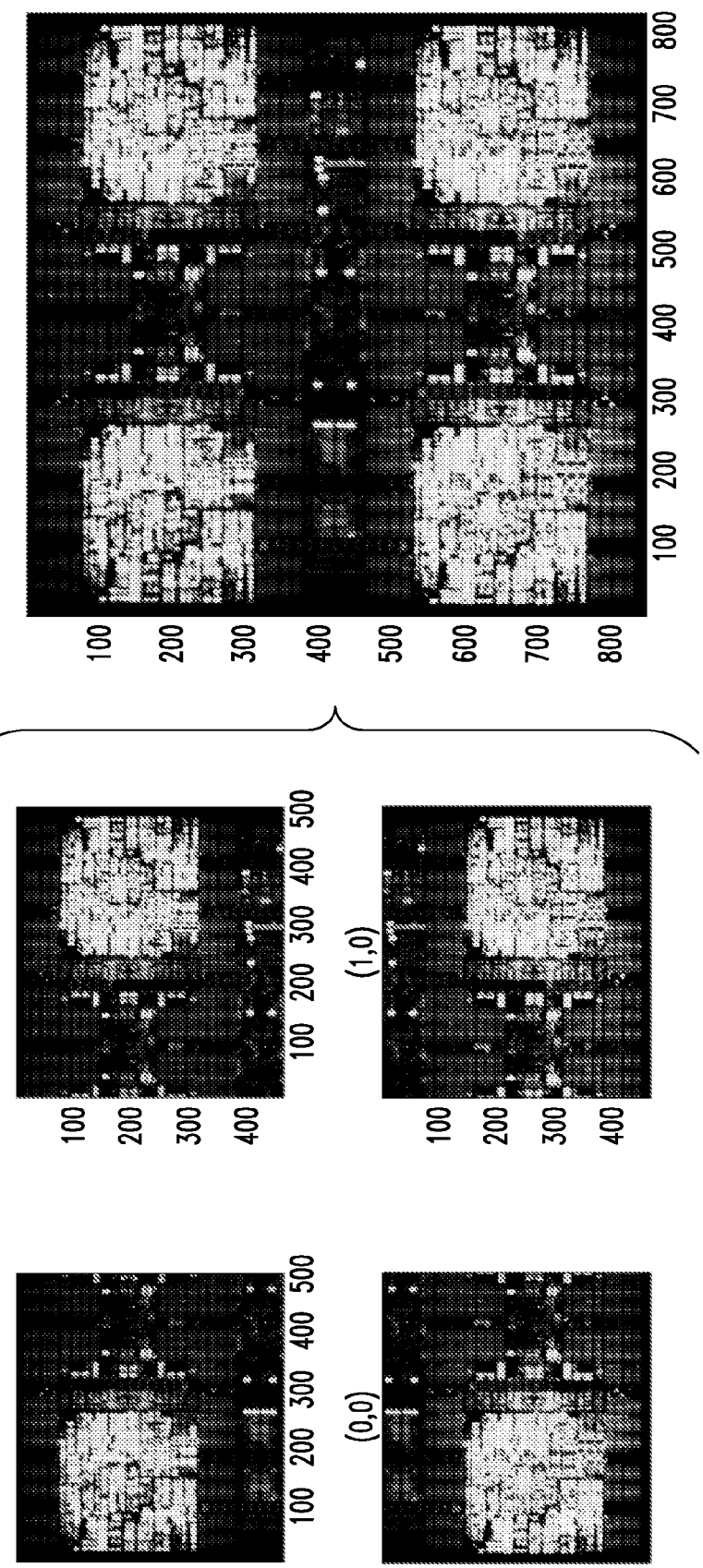
FIG. 12 illustrates stitching portions of multiple emission images to form a composition emission image according to an embodiment of the invention.

Also, the LEOSLC image may be obtained from the composition of several different partially-overlapping images of the chip, which are stitched together. Such overlapping and stitching is illustrated in FIG. 12. It is to be understood that the variability map creation method may requires a trade off between resolution and area coverage when the chip is particularly large and sensors are small in order to achieve a high spatial resolution of the variability map. Given that any camera used for acquiring the emission has a limited number of pixels, for a given area coverage, there is a maximum resolution that can be achieved in the image. Therefore, if one sets the magnification based on the resolution needed to observe the sensor, then multiple images may be necessary to cover the entire chip where the sensors may be located. FIG. 13 shows an emission image composed by a set of 10×10 individual images so that a very high spatial resolution can be achieved over large areas.

Another problematic case is when the chip is larger that the maximum collection area of the optical system at its lowest magnification (e.g., macro lens). This situation is very typical for present and future high end IBM microprocessors such as p6, z6, p7, z7 where the area gets larger and larger with each generation. In this case, there can be optical distortion and artificial attenuation of the emission intensity due to the limited numerical aperture of the optical system. In this case as well, it is necessary to take multiple images of the chip at several locations and subsequently stitch them together to achieve the overall image. Returning to FIG. 12, an example is shown for an IBM z6 EP chip. Since the chip is so large that it does not fit in one macro image, four acquisitions of the four quadrant of the chip were acquired separately in the same conditions, and then stitched together to obtain a single image of the emission intensity.

It is to be further appreciated that the IC/chip is preferably powered on and initialized to a known quiescent state by using test/functional patterns during the time of the emission measurement. Of particular interest is the case in which the structures used to construct the variability map have the same quiescent state during the emission measurement. This can be achieved by initializing the chip in the proper way after the power on or, in some cases, by shutting of the clocks once the initialization process is terminated. Having the chip in a quiescent state allows a reduction of the total power that needs to be dissipated, thus improving the temperature uniformity across the chip. Moreover, interferences from neighboring switching devices are completely removed.

Further, several images of the LEOSLC may be taken in different cooling conditions. The composition of such images is then created to remove thermal gradients across the chip. This composition image can then be used as the emission image which is then cross mapped to the layout, as explained above.

Figure 14:
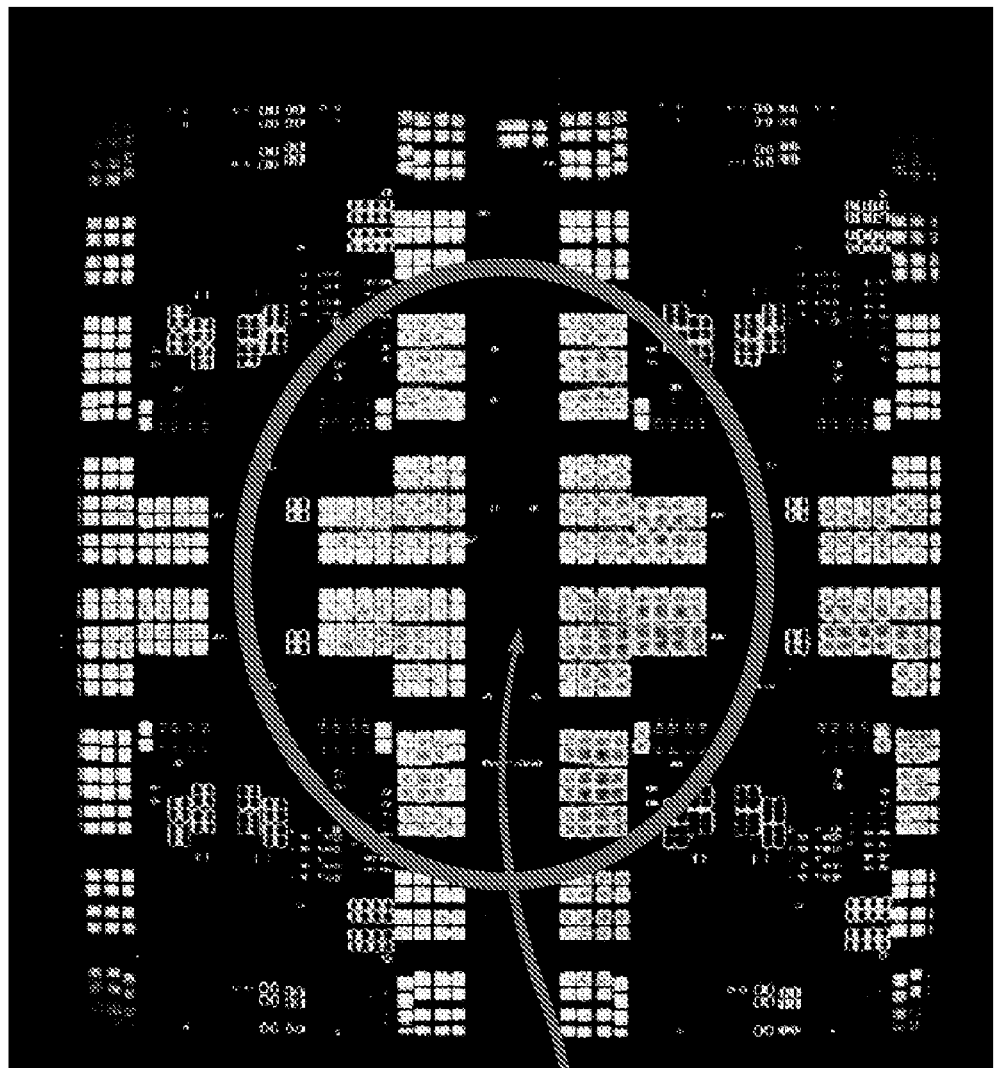
FIG. 14 illustrates an effect of a cooling ring on an emission image according to an embodiment of the invention.

Chip cooling during emission measurements is a general problem that applies to the more specific application of creating variability maps. Using diamond film cooling is quite a common practice because diamond is transparent at the wavelength of interest for these applications and has also a very good heat transmission coefficient that allows efficient spreading of the heat from the chip towards the surrounding cooling ring. This works well for applications not requiring elevated temperature uniformity but it causes the center of the chip to have a higher temperature that causes a higher leakage and therefore a brighter emission, see, for example, FIG. 14. This is an artificial effect that is not connected to the variations across the chip and is particularly difficult to correct for.

Figure 15:
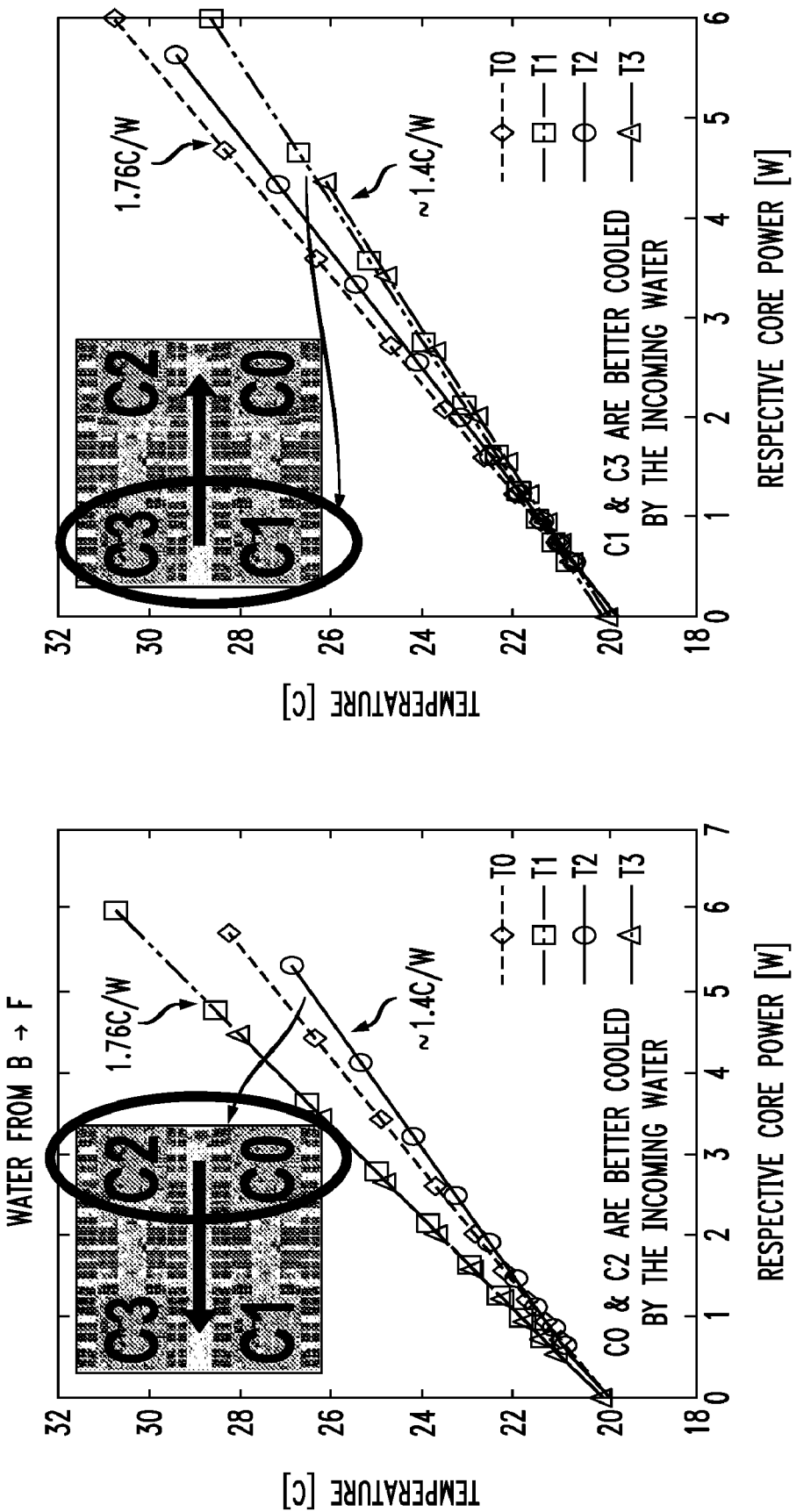
FIG. 15 illustrates a temperature gradient associated with a fluid flow cooling system according to an embodiment of the invention.
Figure 16:
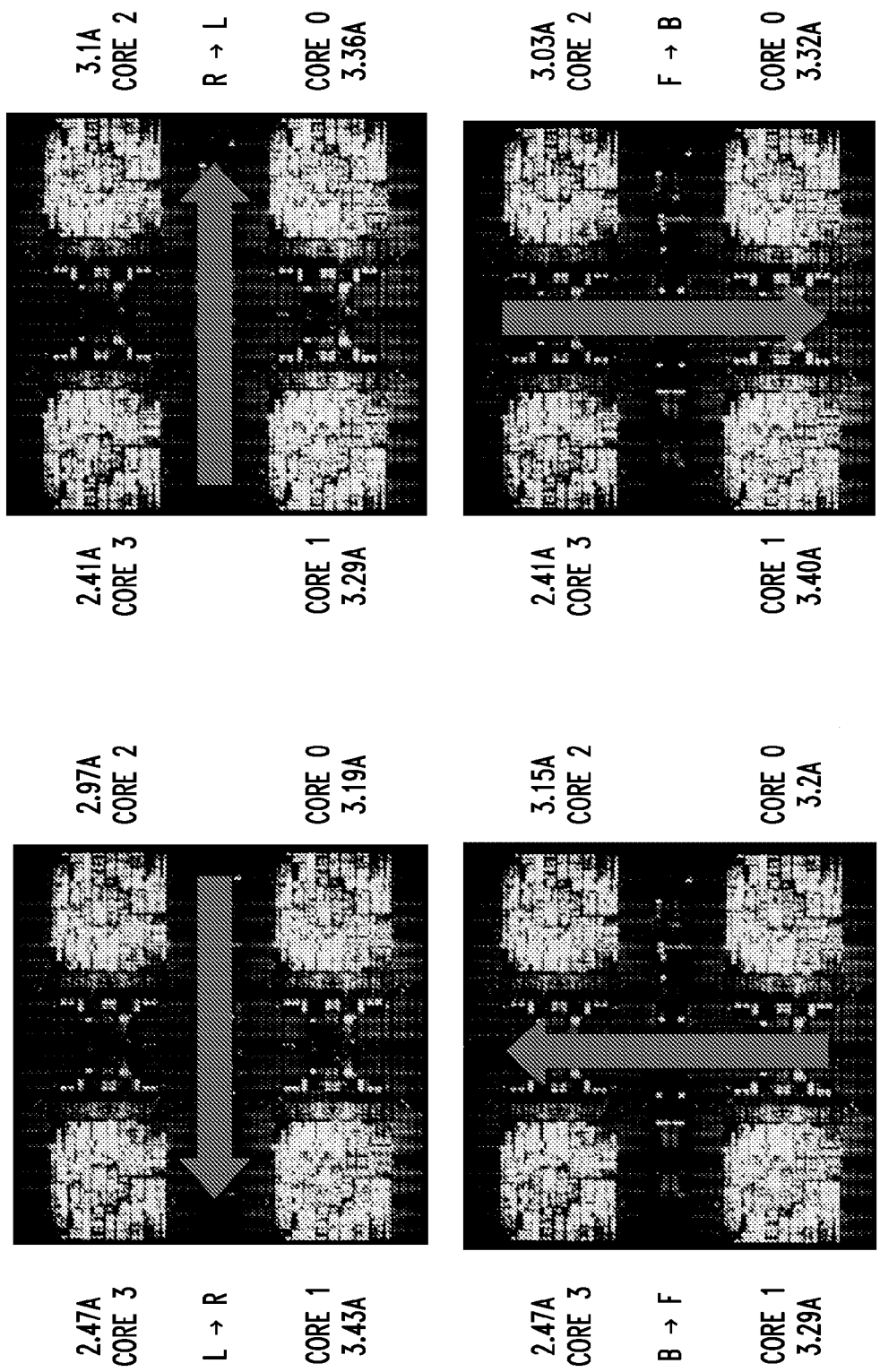
FIG. 16 illustrates an effect of fluid flow cooling on an emission image according to an embodiment of the invention.

Other cooling techniques require fluid flowing across the chip by means of a cooling cell mounted on the back of the chip. A temperature gradient such as the one shown in FIG. 15 may arise depending on the flowing direction of the fluid. Besides trying to reduce the total power of the chip by powering off sub-circuits that are not essential for the analysis, as it has been discussed above, one can also think of taking several images of the emission with the chip initialized in the very same conditions but with the cooling conditions slightly changed. For example, in the case of cooling by means of a fluid, the flow direction may be altered (e.g., inverted or rotated in the four directions, see, for example, FIG. 16). A final composite image is subsequently composed by averaging the individual images and taking advantage of the linear superimposition of the effects.

Figure 17:
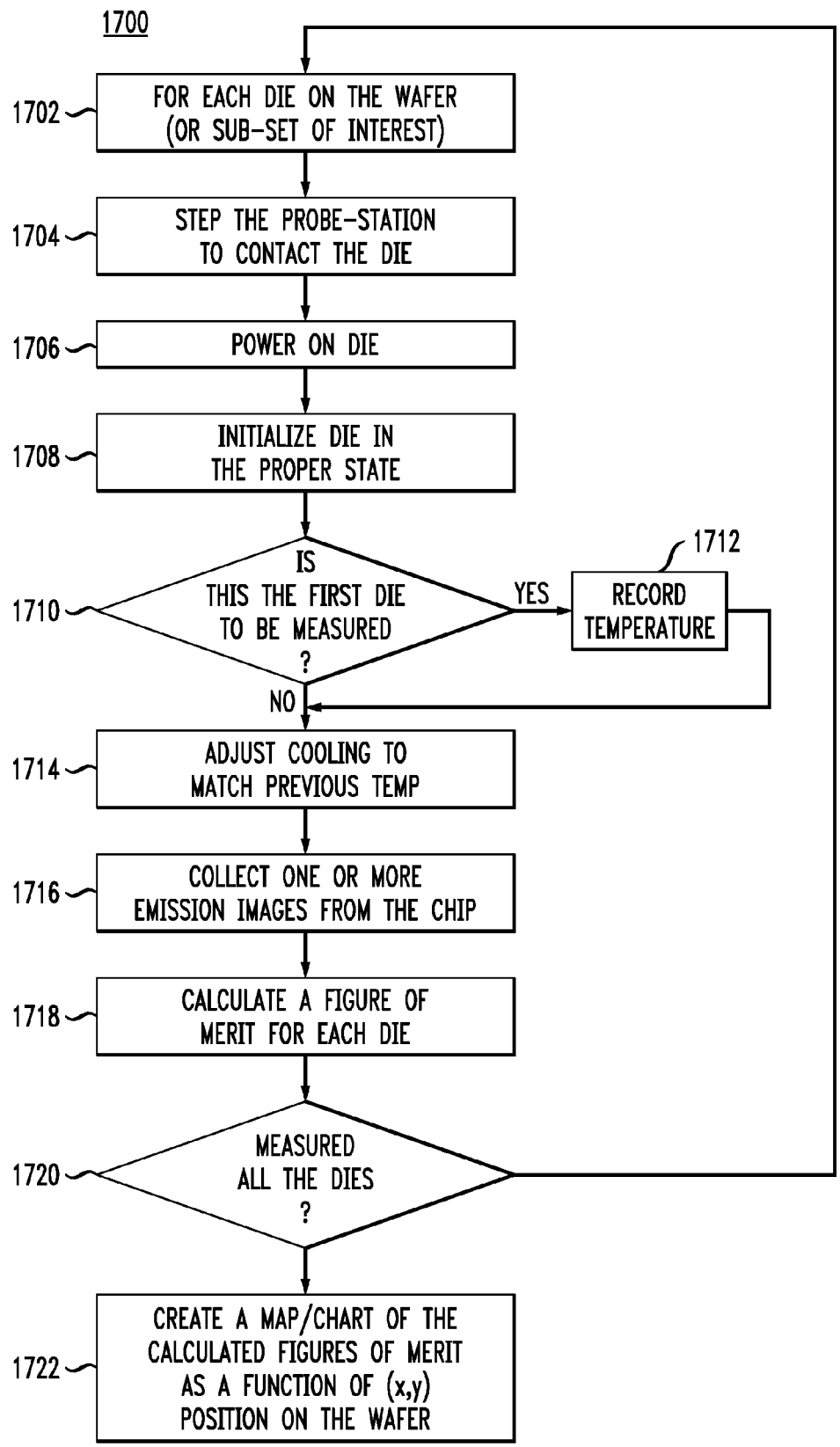
FIG. 17 illustrates a methodology for creating a wafer level variability map according to an embodiment of the invention.

It is to be understood that the above techniques can be used also to create one or more variability maps of entire wafers or portions of the wafer so that longer range effects can be studied and corrected. Several different embodiments are described herein in the context of FIG. 17.

The methodology 1700 for creating a wafer level variability map proceeds as follows. Staring in block 1702, for each die of the wafer (or each die of interest, i.e., a sub set grid), the methodology calls for electrically contacting the die and powering on the chip (step 1704). Step 1706 initializes the chip in the proper state. If this is the first die to be measured (step 1710), the temperature of the die is recorded (step 1712). If not, the cooling of the die is adjusted to match temperature of the first die (step 1714)—which was recorded in step 1712. The temperature of the dies should be kept constant for all measurements. Thus, as explained above, the temperature is recorded at which the first measurement is taken and all the subsequent measurements will be taken at the same temperature by adjusting the cooling conditions.

The methodology then proceeds similar to that described above for the IC level variability map. That is, in step 1716, one or more emission images of the LEOSLC are collected. In step 1718, one (the entire die is concentrated in one number and compared to the others to look for gross variations) or usually more (there are enough figures of merit per die to give spatial resolution inside the die but extend the map across different dies) figure of merit is calculated for each die. Once all dies have been measured as such (step 1720), a map or chart of the calculated figures of merit is created as a function of the (x,y) position of the wafer (step 1722).

One may also notice that it is possible to create such a wafer map even after the wafer has been diced. One will have to measure each chip independently after it has been mounted on a substrate and then assemble the collected data to create a map by using the information of where each chip was located on the wafer.

Depending on what feature/figure of merit is picked for each die measurement one can have the following main cases.

In one embodiment, the entire die is used as reference structure, so each dies is powered on, initialized and its emission taken in succession. A wafer map is then created by plotting a figure of merit of each dies, e.g., the total emission from the die.

Additional smaller structures inside the die may be used to create the wafer map with a significantly higher spatial resolution compared to using just the die itself as a reference structure. In particular, principles of the invention provide two main approaches:

(1) The reference structures of each die/chip are used to create a map for the particular chip. Then, the process is repeated for each die of interest and then the maps are compared and analyzed.

(2) Alternatively, each chip is individually powered on, initialized and measured, but the figure of merit of each reference structure is saved with new coordinates referring to the wafer locations. When all the dies of interest have been measured, a variability map may be created from all the figures of merit with the wafer coordinates.

Principles of the invention also provide methodologies for calibrating/normalizing variability maps.

For some applications, a precise calibration of the variation calculated based on the inventive method with electrical performance is desired. In the following, we propose two methodologies to achieve this objective.

In the first methodology, the very high resolution variability map calculated using the memory sub-array may be normalized using the few on chip process sensitive ring oscillators (PSRO) that are available in several locations across the chip. Appropriate fitting of the variability map may be desired prior to this step to adapt the grid of data to the PSRO locations. One illustrative way to perform such normalization includes creating a curve of the emission as a function of the electrical parameters in some common locations (an interpolation of neighboring data may be employed to obtain the data for the same common locations). The curve created for a few points is then fitted and used to normalize the remaining points. Another illustrative way to perform the normalization includes selecting a transformation function (for example, a linear transformation function) and calculating the coefficients of such function by applying the function to the variability map created from the emission data and minimizing the error/difference (possibly using a least mean square algorithm) from the map created with the electrical data in the common points (usually where the few electrical data points are available).

In the second methodology, the dependence between emission and some electrical parameters such as leakage current or switching speed may be fully characterized when individual gates are made available in kerf structures where all the most important electrical parameters can be monitored during the emission measurements. A conversion curve can be calculated and subsequently used to calibrate the variability maps. Let us assume that the structure selected for monitoring the variability is a buffer. If the same buffer is fully available in one of the kerf structures, then its emission may be characterized separately as a function of key electrical parameters responsible for variability, such as current, voltage, switching speed, performance, threshold voltage, channel length, etc. By constructing a curve linking the emission to the key variability source, the system can then fit such data point and use the equation to normalize the variability map obtained with the methodology described herein. This may remove the need of having distributed electrical data for the normalization described in the previous paragraph.

Figure 18:
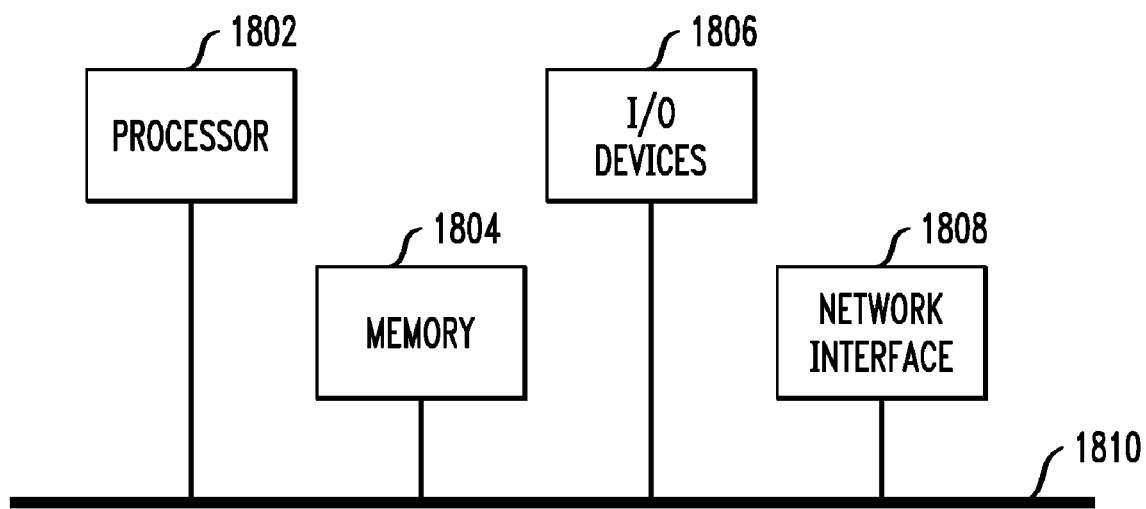
FIG. 18 illustrates a computing system in accordance with which one or more components/methodologies of the invention may be implemented according to an embodiment of the present invention.

Referring lastly to FIG. 18, an exemplary implementation 1800 of a computing system in accordance with which one or more components/methodologies of the invention (e.g., components/methodologies described in the context of FIGS. 1-17) may be implemented is depicted, according to an embodiment of the present invention. For example, the exemplary implementation may represent the computing system (e.g., 210 in FIG. 2) used to control acquisition, correlation and analysis of the data representing the LEOSLC images, the layout, the cross mapping, and the variability map.

As shown, the methodologies described herein may be implemented in accordance with a processor 1802, a memory 1804, I/O devices 1806, and a network interface 1808, coupled via a computer bus 1810 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. It is understood that a memory device mentioned here is example of "computer readable storage medium," which may constitute an article of manufacture when software instructions or code for implementing techniques of the invention are stored for execution thereon.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Thus, as mentioned above, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for monitoring one or more manufacturing process variations associated with a device under test, comprising the steps of:
    obtaining an emission image representing an energy emission associated with a leakage current of the device under test;
    correlating the emission image with a layout of the device under test to form a cross emission image;
    selecting common structures on the cross emission image and identifying the common structures as regions of interest;
    calculating one or more variability measures based on the energy emissions associated with the regions of interest; and
    creating a variability map based on the calculated variability measures, wherein the variability map is useable to monitor the one or more manufacturing process variations associated with the device under test.

2. The method of claim 1, wherein the variability map is created by plotting the calculated variability measures as a function of positions of the regions of interest.

3. The method of claim 1, wherein the energy emission associated with the leakage current of the device under test comprises a light emission from off-state leakage current of the device under test.

4. The method of claim 1, wherein at least one of the variability measures is calculated by integrating the energy emission over a region of interest.

5. The method of claim 1, wherein selection of the common structures is performed such that structures of a smaller granularity and a higher spatial resolution are progressively selected.

6. The method of claim 1, wherein the device under test comprises at least a portion of an integrated circuit.

7. The method of claim 1, wherein the emission image is obtained from an image capture device.

8. The method of claim 1, wherein the emission image is obtained from a composition of two or more emission images of the device under test.

9. The method of claim 8, wherein the two or more emission images comprise different partially-overlapping emission images of the device under test.

10. The method of claim 8, wherein the two or more emission images comprise emission images taken in at different cooling conditions such that the composition of the two or more emission images is created to remove thermal gradients across the device under test.

11. The method of claim 1, wherein the device under test is initialized to a known quiescent state by using one or more test patterns, prior to capture of the emission image.

12. A method for monitoring one or more manufacturing process variations associated with a semiconductor wafer, comprising the steps of:
    obtaining an emission image representing an energy emission associated with a leakage current of a first die of the wafer;
    calculating a variability measure based on the energy emission associated with the first die;
    repeating the obtaining and calculating steps for at least a second die of the wafer; and
    creating at least one variability map based on the calculated variability measures of the first die and the at least a second die, wherein the at least one variability map is useable to monitor the one or more manufacturing process variations associated with the wafer.

13. The method of claim 12, wherein the variability map creating step further comprises creating a die variability map for each die and then the individual maps are assembled to create a wafer variability map.

14. The method of claim 12, wherein the variability map creating step further comprises creating a wafer level variability map directly from the emission images of the first die and the at least a second die.

15. A method for monitoring one or more manufacturing process variations associated with a device under test, comprising the steps of:
    forming a first variability map by:
        obtaining an emission image representing an energy emission associated with a leakage current of the device under test;
        correlating the emission image with a layout of the device under test to form a cross emission image;
        selecting common structures on the cross emission image and identifying the common structures as regions of interest;
        calculating one or more variability measures based on the energy emissions associated with the regions of interest; and
        creating the first variability map based on the calculated variability measures, wherein the first variability map is useable to monitor the one or more manufacturing process variations associated with the device under test;
    comparing the first variability map to one or more reference points; and
    calibrating the first variability map based on the comparison.

16. The method of claim 15, wherein the one or more reference points comprise reference points of lower resolution than the selected common structures.

17. The method of claim 15, wherein calibration is achieved by characterizing structures used to create the first variability map individually in a kerf.

18. Apparatus for monitoring one or more manufacturing process variations associated with a device under test, comprising:
    a memory; and
    at least one processor coupled to the memory and configured to: cause acquisition of an emission image representing an energy emission associated with a leakage current of the device under test; correlate the emission image with a layout of the device under test to form a cross emission image; enable selection of common structures on the cross emission image and identifying the common structures as regions of interest; calculate one or more variability measures based on the energy emissions associated with the regions of interest; and create a variability map based on the calculated variability measures, wherein the variability map is useable to monitor the one or more manufacturing process variations associated with the device under test.

19. The apparatus of claim 18, wherein the variability map is created by plotting the calculated variability measures as a function of positions of the regions of interest.

20. The apparatus of claim 18, wherein the energy emission associated with the leakage current of the device under test comprises a light emission from off-state leakage current of the device under test.

21. The apparatus of claim 18, wherein at least one of the variability measures is calculated by integrating the energy emission over a region of interest.

22. The apparatus of claim 18, wherein selection of the common structures is performed such that structures of a smaller granularity and a higher spatial resolution are progressively selected.

23. The apparatus of claim 18, wherein the device under test comprises at least a portion of an integrated circuit.

24. The apparatus of claim 18, wherein the variability map is created on a wafer level.

25. The apparatus of claim 18, wherein the variability map is calibrated through comparison to at least one or more reference points.

* * * * *